United States Patent [19]

Akado et al.

[11] 4,077,787
[45] Mar. 7, 1978

[54] AIR CLEANER FOR AUTOMOTIVE VEHICLE

[75] Inventors: Hajime Akado, Kariya; Hideo Kamo, Chiryu; Kazunori Nakane, Nishio, all of Japan

[73] Assignee: Nippondenso Co., Ltd., Kariya, Japan

[21] Appl. No.: 711,642

[22] Filed: Aug. 4, 1976

[30] Foreign Application Priority Data

Aug. 6, 1975 Japan ............... 50-109476[U]

[51] Int. Cl.² .................................... B01D 51/00
[52] U.S. Cl. ............................. 55/419; 55/267; 123/119 DB; 123/122 D; 236/13
[58] Field of Search ............ 55/385 B, 419, 266, 55/267, 217; 123/122 D, 122 H, 122 R, 119 D, 119 DB; 236/13

[56] References Cited

U.S. PATENT DOCUMENTS

| 3,355,863 | 12/1967 | Pittsley | 55/480 X |
| 3,394,687 | 7/1968 | Scott | 55/510 X |
| 3,450,119 | 6/1969 | Sendelbach | 123/122 D |
| 3,459,163 | 8/1969 | Lewis | 55/419 X |
| 3,513,817 | 5/1970 | Kearsley | 55/510 X |
| 3,574,988 | 4/1971 | Buckman | 123/122 D X |
| 3,741,179 | 6/1973 | Vartanian | 55/419 X |

FOREIGN PATENT DOCUMENTS

| 2,342,156 | 4/1975 | Germany | 55/419 |
| 1,373,401 | 11/1974 | United Kingdom | 55/510 |

Primary Examiner—Frank W. Lutter
Assistant Examiner—Kathleen J. Prunner
Attorney, Agent, or Firm—Cushman, Darby & Cushman

[57] ABSTRACT

An air induction pipe for an air cleaner formed of a synthetic resin and as a pair of longitudinally divided pipe members. Each of the pipe members includes a fixing portion integrally formed thereon for mounting a diaphragm unit which is used to control air flow. The diaphragm unit is interposed between the fixing portions, and the pipe members combined to form the air induction pipe, thereby to fixedly secure the diaphragm unit to the air induction pipe only by the pipe members.

4 Claims, 9 Drawing Figures

AIR CLEANER FOR AUTOMOTIVE VEHICLE

BACKGROUND OF THE INVENTION

(1) Field of the Invention

The present invention relates to an air cleaner for an automotive vehicle, more particularly to an air cleaner having a valve disposed in an air induction pipe and driven by a diaphragm unit for passing warmer air to the air induction pipe communicating with an internal combustion engine when the ambient temperature is low.

(2) Description of Prior Art

In a conventional air cleaner for an internal combustion engine, a diaphragm unit for controlling induction of warmer air to an air induction pipe is assembled to the air induction pipe in such a manner that the diaphragm unit is first interposed between the air induction pipe and a separate plate and then they are fixed together, for example by means of a bolt and nut.

Therefore, it is disadvantageous in that a number of elements such as the separate plate, the bolt and nut and so on are required for fixing the diaphragm unit to the air cleaner, causing an increase of cost and troublesome assembling steps.

SUMMARY OF THE INVENTION

It is, therefore, an object of the present invention to provide an air cleaner which is low in cost and easy to assemble a diaphragm unit thereto.

According to the present invention, an air induction pipe is made of a synthetic resin and formed of a pair of longitudinally divided pipe members and a fixing portion for a diaphragm unit is respectively formed integrally with the pipe members, so that a number of part elements may be reduced and the diaphragm unit is easily assembled to the air induction pipe.

The other objects and features of the present invention will become more apparent from the following description when read in connection with the drawings.

DETAILED DESCRIPTION OF THE PREFERRED EMBODIMENTS

Figure 1:
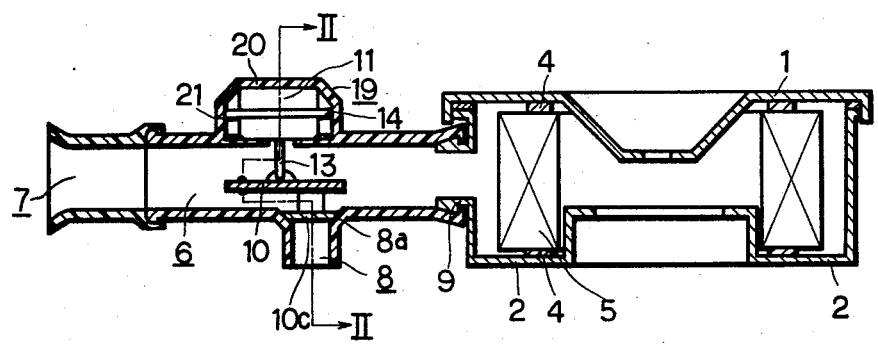
FIG. 1 is a sectional view of an air cleaner showing a first embodiment according to the present invention.
Figure 2:
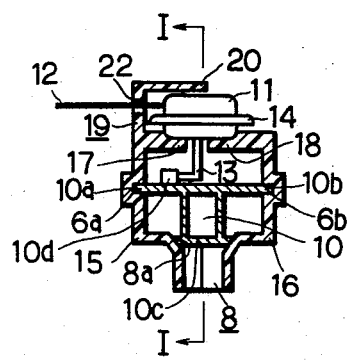
FIG. 2 is a sectional view taken along line II—II in FIG. 1.
Figure 3:
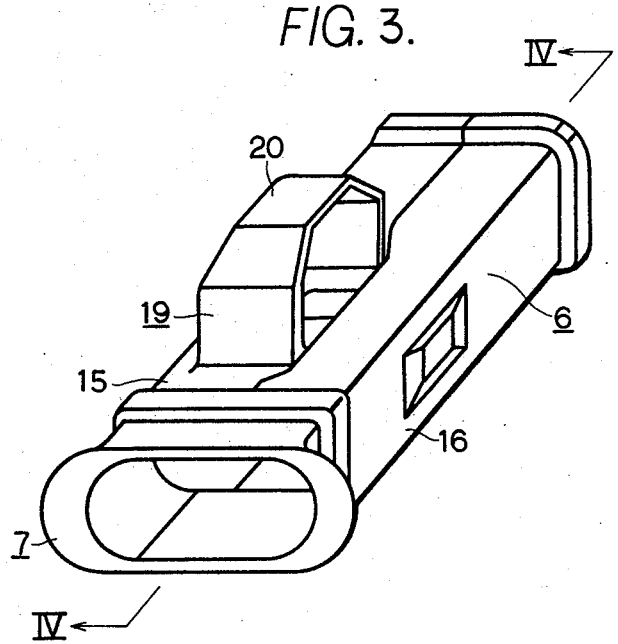
FIG. 3 is a perspective view of an air induction pipe shown in FIG. 1.
Figure 4:
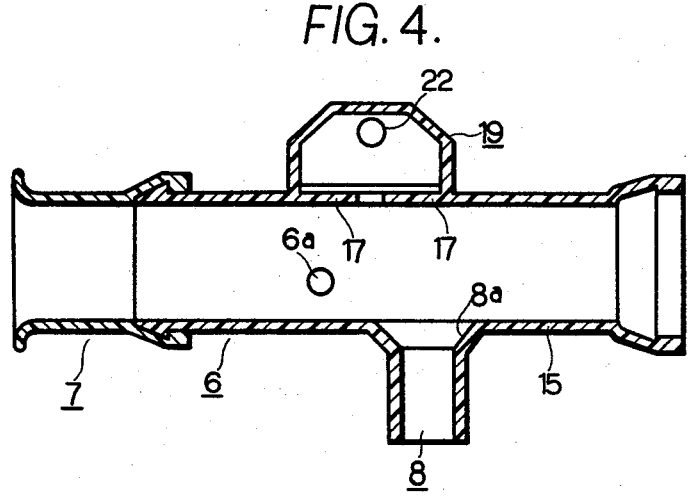
FIG. 4 is a sectional view taken along line IV—IV in FIG. 3.

Referring to FIGS. 1 to 4 showing a first embodiment of an air cleaner according to the present invention, numeral 1 designates a cap for a casing 2, both of which are made of either a synthetic resin or a metal such as iron. The casing 2 houses therein a filter element 5 which is supported by the cap 2 and a bottom plate of the casing 2 through gaskets 4. Air passing through the filter element 5 is cleaned and introduced to an engine (not shown) in a well-known manner. The casing 2 is provided with a pipe 9, to which an air induction pipe 6 is coupled by press-fitting. A main air induction port 7 is coupled to the other end of the air induction pipe 6 by likewise press-fitting. The air induction pipe 6 also includes an auxiliary air induction port 8 opening to a portion, for example adjacent an exhaust manifold of the engine for introducing warmer air around the exhaust manifold when the ambient temperature is low.

The air induction pipe 6 comprises a pair of longitudinally divided pipe members 15 and 16, which are coupled together by a suitable manner such as press-fitting to form the air induction pipe 6.

Step portions 17 and 18 are provided on each upper end of the respective pipe members 15 and 16. A housing 19 is integrally formed on the upper end of the pipe member 15.

A diaphragm unit 11 of a well-known pressure responsive type is disposed in the housing 19. The bottom of the diaphragm unit 11 is placed on the step portions 17 and 18 and the top of the diaphragm unit 11 abuts on a roof 20 of the housing 19 forming a support member, while a flanged portion 14 of the unit 11 interposed between the side portions 21 of the housing 19. Thus the diaphragm unit 11 is fixedly secured in the housing 19.

A hole 22 is formed at a back wall of the housing 19, through which a conduit 12 passes for communicating a pressure chamber of the diaphragm unit 11 with an intake manifold of the engine to introduce a negative pressure from the intake manifold to the pressure chamber.

The introduction of the negative pressure to the pressure chamber is controlled by a conventional well-known temperature responsive device, such as, of a wax type.

The diaphragm unit 11 has a rod 13 connected to a diaphragm (not shown) disposed in the unit 11 and fixed at the flanged portion 14, so that the rod 13 as well as the diaphragm is driven back and forth in response to the negative pressure in the pressure chamber.

A valve 10 is pivotally secured to the air induction pipe 6 around an axis of projections 10a and 10b, which are pivotally inserted into recesses 6a and 6b provided on the respective pipe members 15 and 16. A valve head 10c of the valve 10 seats on a valve seat 8a formed at the auxiliary air induction pipe 8, and the rod 13 of the diaphragm unit 11 is linked with the valve 10 at a portion 10d of the valve, so that the valve 10 is pivotally moved up when the negative pressure is introduced into the pressure chamber, to thereby close the main air induction port 7 and instead open the auxiliary air induction port 8 allowing warmer air around the exhaust manifold to pass through the auxiliary air induction port 8, the filter element 5 and to the engine.

When assembling the diaphragm unit 11 to the air induction pipe 6, the unit 11 is first disposed in the housing 19 in such a manner that the bottom thereof seats on the step portion 17 of the pipe member 15 and the top thereof abuts on the roof 20. And then the other pipe member 16 is coupled to the pipe member 15 in such a manner that the bottom of the diaphragm unit 11 seat on the step portion 18 of the pipe member 16. As noted above, any special elements for fixing the diaphragm unit 11 to the air induction pipe is not required.

Figure 5:
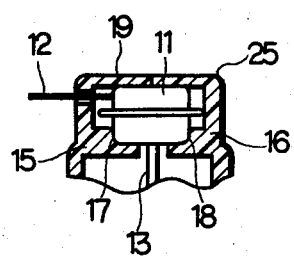
FIG. 5 is a sectional view showing a second embodiment according to the present invention.
Figure 7:
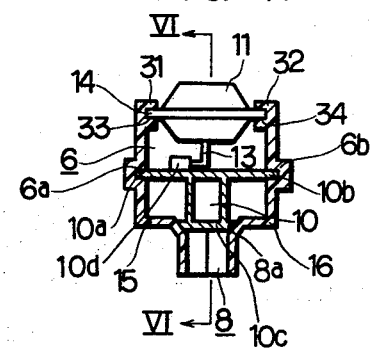
FIG. 7 is a sectional view taken along line VII—VII in FIG. 6.
Figure 6:
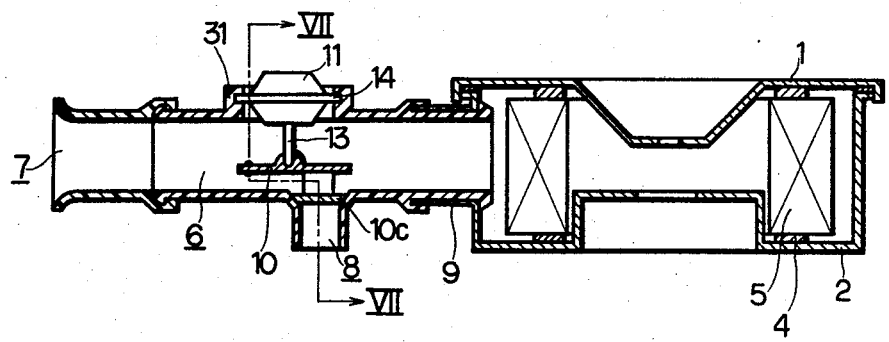
FIG. 6 is a sectional view of an air cleaner showing a third embodiment according to the present invention.
Figure 8:
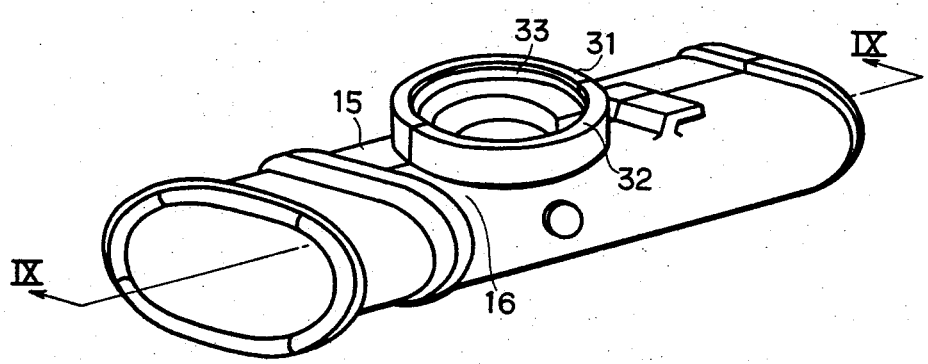
FIG. 8 is a perspective view of an air induction pipe shown in FIG. 6.
Figure 9:
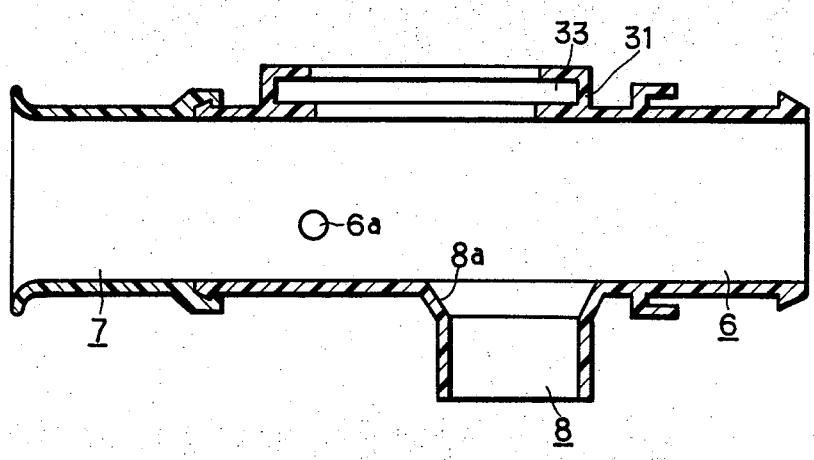
FIG. 9 is a sectional view taken along line IX—IX in FIG. 8.

FIG. 5 shows a second embodiment of the present invention, in which a housing 25 symmetrical to the housing 19 is integrally formed on the upper end of the pipe member 16, thus entirely enclosing the diaphragm unit 11 in the housings 19 and 25.

Referring to the third embodiment of the present invention shown in FIGS. 6 to 9, the same reference numerals designate the same or equivalent parts.

Semi-circular projections 31 and 32 are integrally formed on the respective upper ends of the pipe members 15 and 16, and grooves 33 and 34 are formed on the inner surface of the projections 31 and 32, into which the flanged portion 14 of the diaphragm unit 11 is inserted thus to hold the unit 11 in place.

What is claimed is:

1. An air cleaner for an automotive vehicle comprising:
    a filter element for cleaning air passing therethrough;
    a casing housing said filter element;
    an air induction pipe, coupled to said casing, and having a main air induction port and an auxiliary air induction port;
    a valve disposed in said air induction pipe for closing and opening said main and auxiliary air induction ports; and
    a diaphragm unit, secured to said air induction pipe and connected to said valve for actuating said valve to close said main air induction port and open said auxiliary air induction port when the ambient temperature is low, wherein said air induction pipe comprises a pair of longitudinally divided pipe members, each having a support member integrally formed thereon in an opposite relationship with each other for holding said diaphragm unit therebetween.

2. An air cleaner for an automotive vehicle comprising:
    a filter element for cleaning air passing therethrough;
    a casing housing said filter element;
    an air induction pipe, coupled to said casing, and having a main air induction port and an auxiliary air induction port, said air induction pipe being made of a synthetic resin and formed of a pair of longitudinally divided pipe members, each upper end of said pipe members being formed with a step portion;
    a housing, having a roof, and integrally formed on an upper end of one of said pipe members;
    a diaphragm unit disposed in said housing, the bottom thereof seating on said step portions of said pipe members; and
    a valve connected to said diaphragm unit and pivotally disposed in and secured to said air induction pipe, and having a valve head seating on a valve seat of said auxiliary air induction port and being actuated by said diaphragm unit to open said auxiliary air induction port.

3. An air cleaner for an automotive vehicle comprising:
    a filter element for cleaning air passing therethrough;
    a casing housing said filter element;
    an air induction pipe, coupled to said casing, and having a main air induction port and an auxiliary air induction port, said air induction pipe being made of a synthetic resin and formed of a pair of longitudinally divided pipe members;
    a pair of semi-circular projections integrally formed on the respective pipe members, the inner surface of each said semi-circular projections being formed with a groove;
    a diaphragm unit having a flanged portion inserted into said grooves, said diaphragm unit being fixedly secured to said air induction pipe only by said grooves; and
    a valve connected to said diaphragm unit and pivotally disposed in and secured to said air induction pipe, and having a valve head seating on a valve seat of said auxiliary air induction port and being actuated by said diaphragm unit to open said auxiliary air induction port.

4. An air cleaner for an automotive vehicle as claimed in claim 3, wherein each of said longitudinally divided pipe members has a recess on its inner surface for pivotably mounting said valve, and said valve has a projection at each end to be inserted into one of said recesses, whereby said valve is supported only by said recesses and projection construction.

* * * * *